(No Model.)

2 Sheets—Sheet 1.

C. STORLA.
LAND ROLLER AND HARROW.

No. 495,848.

Patented Apr. 18, 1893.

WITNESSES:

INVENTOR:
C. Storla
BY
Munn & Co
ATTORNEYS.

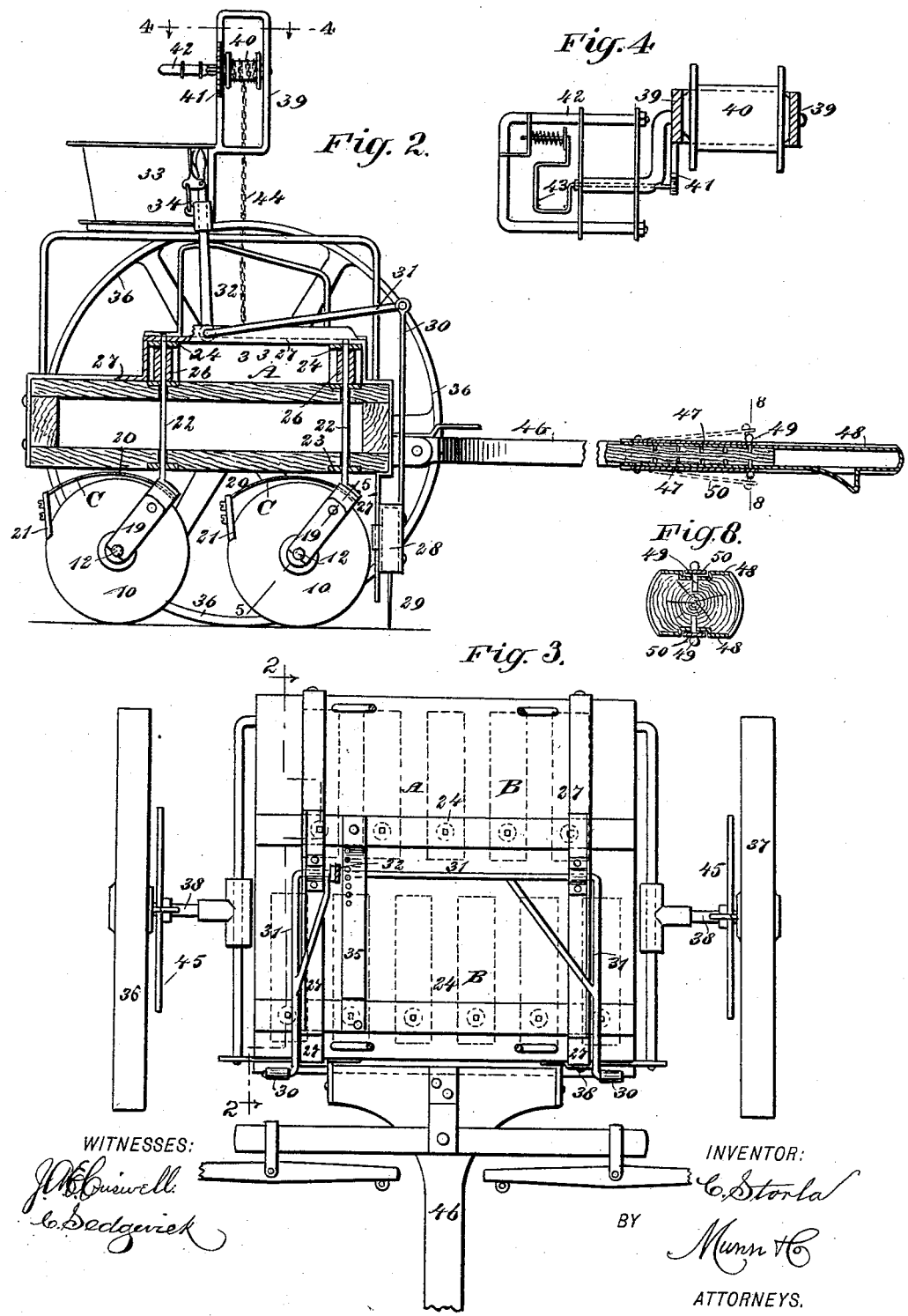

UNITED STATES PATENT OFFICE.

CARL STORLA, OF BELFORD, SOUTH DAKOTA.

LAND-ROLLER AND HARROW.

SPECIFICATION forming part of Letters Patent No. 495,848, dated April 18, 1893.

Application filed February 17, 1892. Serial No. 421,844. (No model.)

*To all whom it may concern:*

Be it known that I, CARL STORLA, of Belford, in the county of Aurora and State of South Dakota, have invented a new and useful Improvement in a Combined Land-Roller and Harrow, of which the following is a full, clear, and exact description.

My invention relates to an improvement in land rollers having combined therewith a harrow, or a device for distributing and to an extent pulverizing the lumps of earth in advance of the rollers.

One of the objects of the invention is to so locate the rollers with respect to each other that the rear rollers will be opposite the space intervening the forward rollers and will overlap the track of said rollers, thus insuring each particle of the ground over which the implement is pasing being pressed uniformly by such passage, and preventing the formation of ribs, so commonly made by this class of machines where a number of rollers are combinedly used.

Another object of the invention is to provide a machine of this kind with markers capable of being raised and lowered and adapted to indicate to the driver the point over which the center of the implement shall be driven in order to thoroughly cover the ground to be operated upon.

Another object of the invention consists in the attachment to the forward portion of the implement of a harrow especially adapted for breaking or pulverizing lumps of earth in advance of the rollers, and to so construct each of the rollers that they will be provided with an efficient scraper and a reservoir for oil, the latter affording a means for constantly keeping the pivots of the rollers in a lubricated condition.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1:
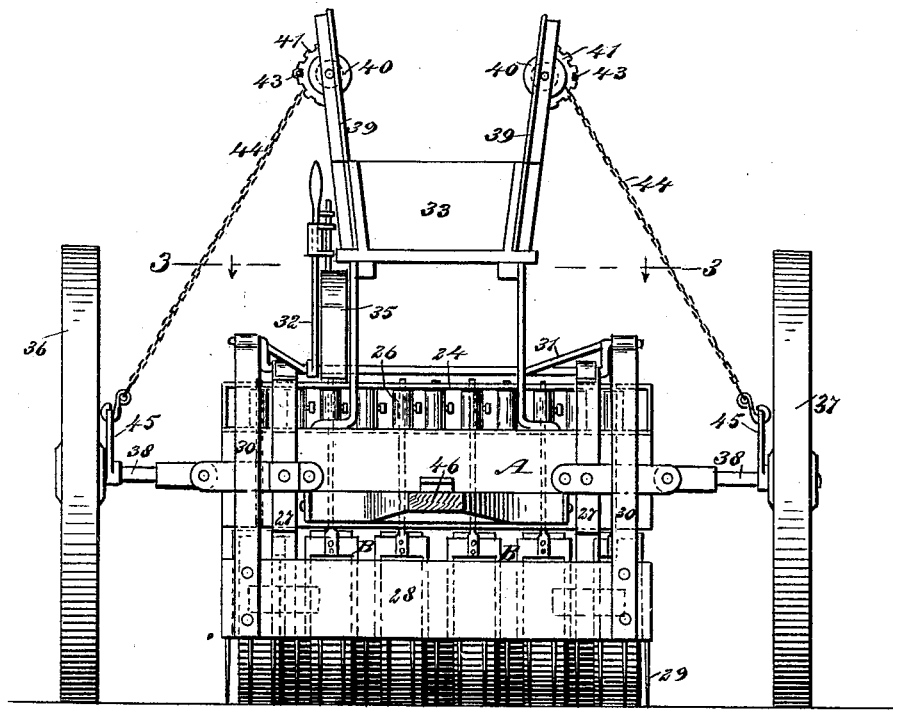
Figure 5:
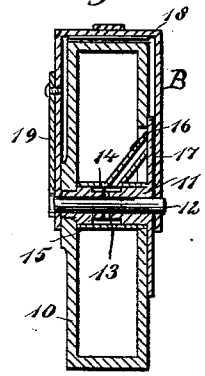
Figure 7:
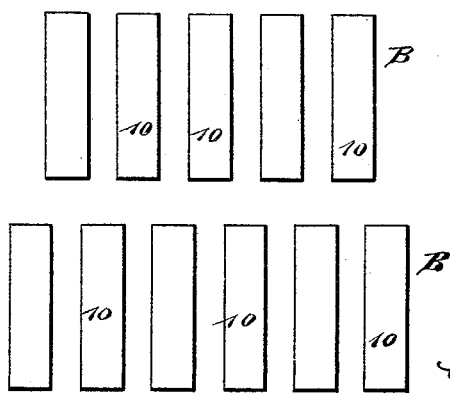
Figure 6:
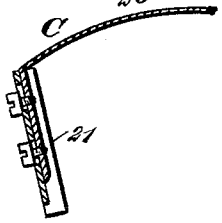

Figure 1 is a front elevation of the implement, the tongue being in transverse section. Fig. 2 is a transverse section through the body of the implement, said section being taken essentially upon the line 2—2 of Fig. 3. Fig. 3 is a plan view of the body of the implement, the upper portion or superstructure thereof being in horizontal section, which section is taken practically on the line 3—3 of Fig. 1. Fig. 4 is a detail view of one of the devices adapted for raising and lowering the markers, the view being partially in section and the section being taken upon the line 4—4 of Fig. 2. Fig. 5 is a central vertical section through one of the rollers, taken practically on the line 5—5 of Fig. 2. Fig. 6 is a vertical section through one of the scrapers for the rollers; and Fig. 7 is a diametrical view illustrating the position with relation to each other of series of crushing rollers. Fig. 8 is a section through the pole on the line 8—8 of Fig. 2.

In carrying out the invention, what may be termed practically the body A of the implement is of box-like structure, rectangular in general outline and hollow, the said structure being made hollow in order that it may be weighted with stones, or other hefty material, when it is desired that heavy pressure should be brought to bear upon the ground. This body is supported by a series of rollers B. Usually two series are employed, arranged longitudinally of the body and beneath it. All of the rollers are of like construction, or practically so, and any desired number of rollers may be employed in each series. In detail the rollers are constructed essentially as shown in Fig. 5, in which it will be observed that the body 10 of the roller is hollow, and is provided with a central sleeve or hub 11, receiving an axle or pintle 12, around which the hub, which is secured to the body of the roller, loosely revolves. This hub is provided with a peripheral groove or channel 13, and with diametrical bores 14, leading from said channel to the axle or pintle 12. The hub is surrounded by a sleeve 15, said sleeve being located within the body of the roller, and this sleeve has attached thereto or formed integral therewith a tube 16, adapted as a reservoir for oil, and said tube extends diagonally from the sleeve over the channel 13 in the hub to an engagement with a face plate 17, attached to one outer side of the body and carried by the hub, the said plate being provided with an aperture which may be suitably capped, said aperture being in registry with the opening of the tube.

A yoke 18, is pivoted at its lower ends upon the pintle 12, and the upper portion of the yoke extends over the upper peripheral surface of the body of the roller. This yoke has secured preferably at one side a locking plate 19, engaging at its lower end with one outer extremity of the axle or pintle 12. One object of this locking plate is to prevent the pintle or axle from turning, thus compelling the roller to turn upon its pintle, another object being to provide means whereby the axle can be quickly removed when desirable by simply taking out screw through locking plate, and yoke, and sliding locking plate from its hold on pintle. The roller, however, may be constructed somewhat differently in detail from the manner above described, but the important features in its construction, namely, the oil reservoir and the manner of feeding the oil directly to the axle will be at all times preserved.

A scraper C, is connected with the yoke 18. This scraper comprises an arm 20, connected directly with the rear or bow section of the yoke, as shown in Figs. 2 and 6. This arm extends rearward over the body of the roller, and upon its rear end the scraper plate 21, is adjustably attached by means of set screws or equivalent fastening devices. This scraper plate engages with the peripheral surface at the rear upper portion of the roller body, and is preferably provided at its sides with forwardly-extending flanges, held in engagement with the side surfaces of the body in order to insure an effective cleaning of not only the periphery of the roller but of the side edges adjacent to the periphery.

The yoke of each roller has secured thereto an upwardly extending spindle 22. These spindles are passed through thimbles or bearings 23, located in apertures produced in longitudinal series in both the top and bottom portions of the body A of the implement, as is best shown in Fig. 2. The spindles extend upward some distance beyond the top of the body, ordinarily, and have their upper ends journaled in straps 24, two straps being employed, one for each series of spindles, and these straps are located at an elevation above the top of the body and ordinarily extend from end to end, the spaces between the straps and the body A being filled by a series of sleeves 26, one for each roller spindle, and said sleeves are in their turn provided with set screws, or like devices, whereby the spindles of the rollers are prevented from sliding in the sleeves. The thimbles or bearings 23 have square openings so spindle 22 (which is also square) cannot turn.

The arrangement of the series of rollers B is somewhat peculiar, and constitutes an essential feature of the invention. This arrangement is best shown in the diagrammatic view, Fig. 7, in which it will be observed that the spaces between the forward rollers are less than the width of the peripheral surfaces of the rear rollers, and the rear rollers are located back of the front rollers in such a manner as not only to cover or press the ground remaining unpressed and between the forward rollers, but each roller at the back extends partially over the track of the inner edge of two of the forward rollers. Thus the rear rollers not only press the ground left unpressed by the forward rollers, but also travel in a portion of the path made by the forward rollers, and in this manner no unsightly ridges are left in the ground after the implement has passed over it.

Near each end of the implement, at the top thereof, a bracket 27, is located, which brackets extend transversely from front to rear of the body across the straps 24, and the forward ends of the brackets extend downward in front of the forward series of rollers some distance in direction of the ground. Upon the forward projecting ends of these brackets a head block 28, is held to slide, having guided movement upon the brackets. This head block extends longitudinally along the front of the machine, practically from end to end, and carries a series of harrow teeth 29, arranged at suitable distances apart. The arrangement of the head block 28 upon the brackets 27, is best shown in Fig. 2. This head block is capable of being vertically adjusted, and this is effected by projecting upward from the head arms 30, one being preferably located near each end, and said arms are pivotally attached to a lever 31, somewhat U-shaped in general contour and fulcrumed upon the upper portions of the brackets 27. The lever 31, is provided with a hand lever 32, by means of which it is manipulated. This hand lever extends upward adjacent to the driver's seat 33, located upon suitable supports attached to the top of the body; and the hand lever is provided with a hand latch 34, of any approved construction, engaging when in its normal position, with a rack 35 also carried by the body. Thus by moving the hand lever 32 forward or rearward the head 28 carrying the harrow teeth may be raised or lowered. The drag teeth can enter the ground at various depths as called for by the character of the work.

Markers 36 and 37, are located at each side of the machine. These markers are in the shape of wheels of any approved construction, adapted to revolve loosely upon axles 38, which axles at their inner ends have a hinge connection with the body of the device, so that the markers may be carried to an elevated position out of engagement with the ground when so desired. The markers are located at a distance from the outer rollers of a series a distance essentially equal to the distance from the center roller of the series and the outer ones; that is to say, the space intervening the center of the marker and the center of an outer roller is the same as the distance intervening the center of an outer roller and the center of a central roller. Thus as the machine travels forward, the marking wheels revolve upon the ground, and when the machine is to make its next trip across the field, the driver aims to carry the central rollers over a track made by a marker, in this manner insuring each and every portion of the field being properly operated upon. Any means desired may be employed to raise and lower the markers. Ordinarily, however, a frame 39, is located at each side of the driver's seat, and in each frame a winding drum 40, is pivoted, and one member of the frame has formed thereon a rack 41.

The journal of the drum is secured to the drum and extends in the shape of a crank arm rearward from the frame in which it is journaled. Upon the inner arm of each drum spindle a handle 42, is pivoted, and each of these handles contains a spring-actuated latch 43, which is best shown in Fig. 4, the outer end of the latch being preferably made to pass through and extend beyond that member of the crank arm of the drum spindle upon which the handle is pivoted; and normally the latches 43 engage with the rack 41, so that when this engagement occurs the drum spindles can not be turned to manipulate the drum in any direction; but when it is desired to raise or lower the markers, the drums are revolved by carrying the latches 43 out of engagement with the rack 41, and at the same time revolving the handles 42 in a circle, of which that portion of the spindle carrying the drums is the center. Upon the drums chains 44, or the equivalents thereof are adapted to be wound, the other ends of the chains being attached to the axles 38 in any manner desirable, ordinarily through the medium of plates 45, secured to the axle.

It is often desirable to lengthen or shorten the tongue 46 of the implement so as to bring the team nearer to or to carry it farther away from the body of the implement. To that end the tongue is provided at or near its outer end in its upper and lower faces with a series of apertures 47, and the apertured extremity is covered by a yoke 48, capable of sliding upon the tongue and held in adjustable engagement therewith by pins 49, secured to the outer ends of springs 50, the inner ends of the springs being attached to the yoke one at the top and the other at the bottom. In order that the springs may be flush with the yoke, channels are produced in the latter in which the springs are located as shown in Fig. 8. By this means it will be observed that in a convenient and expeditious manner the team may be advanced or backed a requisite distance and yet be maintained in the desired position with respect to the tongue when once harnessed thereto.

As the implement is drawn forward, the harrow when carried down to an engagement with the ground will pulverize or break and distribute lumps of earth so that the ground will be very well and finely prepared before it is passed over by the rollers.

Having thus described my invention, I claim as new and desire to secure by Letters Patent—

1. The combination with a roller supported frame, of brackets projecting down from the frame, a sliding head mounted on the brackets and provided with teeth, arms projecting upward from the head, a pivoted U-shaped lever having its members pivoted to the said arms, and a hand lever secured to the U-shaped lever and by which it is operated, substantially as described.

2. The combination with a body, of a series of rollers each independently and vertically adjustably mounted in said body, substantially as described.

3. The combination with a body, of two series of rollers one in advance of the other and the rear series of rollers being arranged opposite the spaces intervening the forward set of rollers, each roller being independently and vertically adjustably mounted in the body, substantially as described.

4. The combination with a body, of a series of rollers, yokes in which the rollers are mounted provided with spindles projecting up through the body, a strap arranged above the body and through which the spindles project, and sleeves adjustably secured to the spindles between the strap and body, substantially as described.

5. The combination with a roller, of a spindle upon which the roller is loosely mounted, a yoke having its ends pivoted upon the spindle, and a locking plate secured to the yoke and engaging one end of the spindle to prevent the spindle from turning and also permit the ready removal of said spindle, substantially as described.

6. A roller provided with an oil reservoir leading from one side inward and communicating with the axle of the roller, substantially as described.

7. A hollow roller having a central hub provided with a peripheral groove, and apertures leading from the groove through the hub, and a sleeve surrounding the hub and provided with a tube extending diagonally to and through one side of the roller, substantially as described.

8. In a land roller, the combination, with the body portion thereof and crushing rolls journaled beneath the same, of markers located at the ends of the machine, having a pivotal or a hinged connection with the body, lifting devices carried by the body, comprising drums held to turn in frames, said frames carrying racks, the axles of the drums being attached thereto and formed at one outer end in the shape of a crank arm, handles attached to the crank arm extensions of the drum axles, a spring-pressed latch carried by each handle and normally engaging with one of the racks, and a connection, substantially as shown and described, between the drums of the lifting devices and the markers, as and for the purpose specified.

CARL STORLA.

Witnesses:
ALBERT BARKER,
H. E. WILLIS.